United States Patent
Sato

(10) Patent No.: US 9,195,421 B2
(45) Date of Patent: Nov. 24, 2015

(54) IMAGE FORMING SYSTEM AND IMAGE FORMING APPARATUS

(71) Applicant: Oki Data Corporation, Tokyo (JP)

(72) Inventor: Hideki Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/525,649

(22) Filed: Oct. 28, 2014

(65) Prior Publication Data

US 2015/0178026 A1    Jun. 25, 2015

(30) Foreign Application Priority Data

Dec. 25, 2013   (JP) ................................. 2013-267503

(51) Int. Cl.
   *G06F 3/12*   (2006.01)
(52) U.S. Cl.
   CPC ............ *G06F 3/1238* (2013.01); *G06F 3/1222* (2013.01); *G06F 3/1239* (2013.01); *G06F 3/1288* (2013.01)
(58) Field of Classification Search
   USPC ........................................................ 358/1.14
   See application file for complete search history.

(56) References Cited

U.S. PATENT DOCUMENTS

| | | | | |
|---|---|---|---|---|
| 2005/0114766 A1* | 5/2005 | Yamamoto | ........ | G06F 17/30905 715/277 |
| 2006/0069918 A1* | 3/2006 | Takahashi et al. | ...... | G06F 21/40 713/176 |
| 2007/0127053 A1* | 6/2007 | Tominaga | ............... | G06F 3/121 358/1.14 |
| 2007/0206216 A1* | 9/2007 | Sakagami | ............... | G06F 21/34 358/1.15 |

FOREIGN PATENT DOCUMENTS

| | | |
|---|---|---|
| JP | 2008-146465 A | 6/2008 |
| JP | 2012-190372 A | 10/2012 |

* cited by examiner

*Primary Examiner* — Ngon Nguyen
(74) *Attorney, Agent, or Firm* — Rabin & Berdo, P.C.

(57) ABSTRACT

An image forming system includes a client apparatus, a server apparatus and an image forming apparatus. The client apparatus includes a designating unit. The designating unit designates identification information stored in the server apparatus and image data. The server apparatus includes a first memory unit and a transmitting unit. The first memory unit stores the identification information. The transmitting unit transmits the identification information and the image data designated by the designating unit to the image forming apparatus. The image forming apparatus includes an image forming unit, a second memory unit, an accepting unit and a control unit. The second memory unit stores first authentication information corresponding to the identification information. The accepting unit accepts second authentication information. The control unit restricts the image forming unit from outputting the image data on the sheet, when the second authentication information doesn't correspond to the first authentication information.

18 Claims, 12 Drawing Sheets

| USER NAME | PASSWORD | PERMISSION INFORMATION | THE NUMBER OF PRINTING PERMISSION SHEETS |
|---|---|---|---|
| USER A | abcd | Printing is always permitted | 100 |
| USER B | 1234 | Monochrome printing is only permitted | 50 |
| USER C | 56ef | Monochrome printing is only permitted | 100 |
| USER D | gh78 | Printing is always permitted | 10 |

(columns: 1211, 1212, 1213, 1214)

| ITEM | SETTING VALUE |
|---|---|
| PRINTER NAME | Printer-123456 |
| PRINTER ID | 550e8400-e29b-41d4-a716-446655440000 |
| COLOR | MONOCHROME / COLOR |
| SHEET FEEDING TRAY | TRAY 1 / TRAY 2 / MP TRAY |
| THE NUMBER OF PRINTING | 1 to 999 |
| DUPLEX PRINTING | NOTHING / BINDING A LONG SIDE / BINDING A NARROW SIDE |
| USER NAME | USER A / USER B / USER C / USER D |

1221 — PRINTER NAME
1222 — PRINTER ID
1223 — COLOR
1224 — SHEET FEEDING TRAY
1225 — THE NUMBER OF PRINTING
1226 — DUPLEX PRINTING
1227 — USER NAME

| | ITEM | SETTING VALUE |
|---|---|---|
| 3231 | COLOR | COLOR |
| 3232 | SHEET FEEDING TRAY | TRAY 1 |
| | THE NUMBER OF PRINTING | 1 |
| 3233 | DUPLEX PRINTING | NOTHING |
| 3234 | USER NAME | USER A |
| 3235 | | |

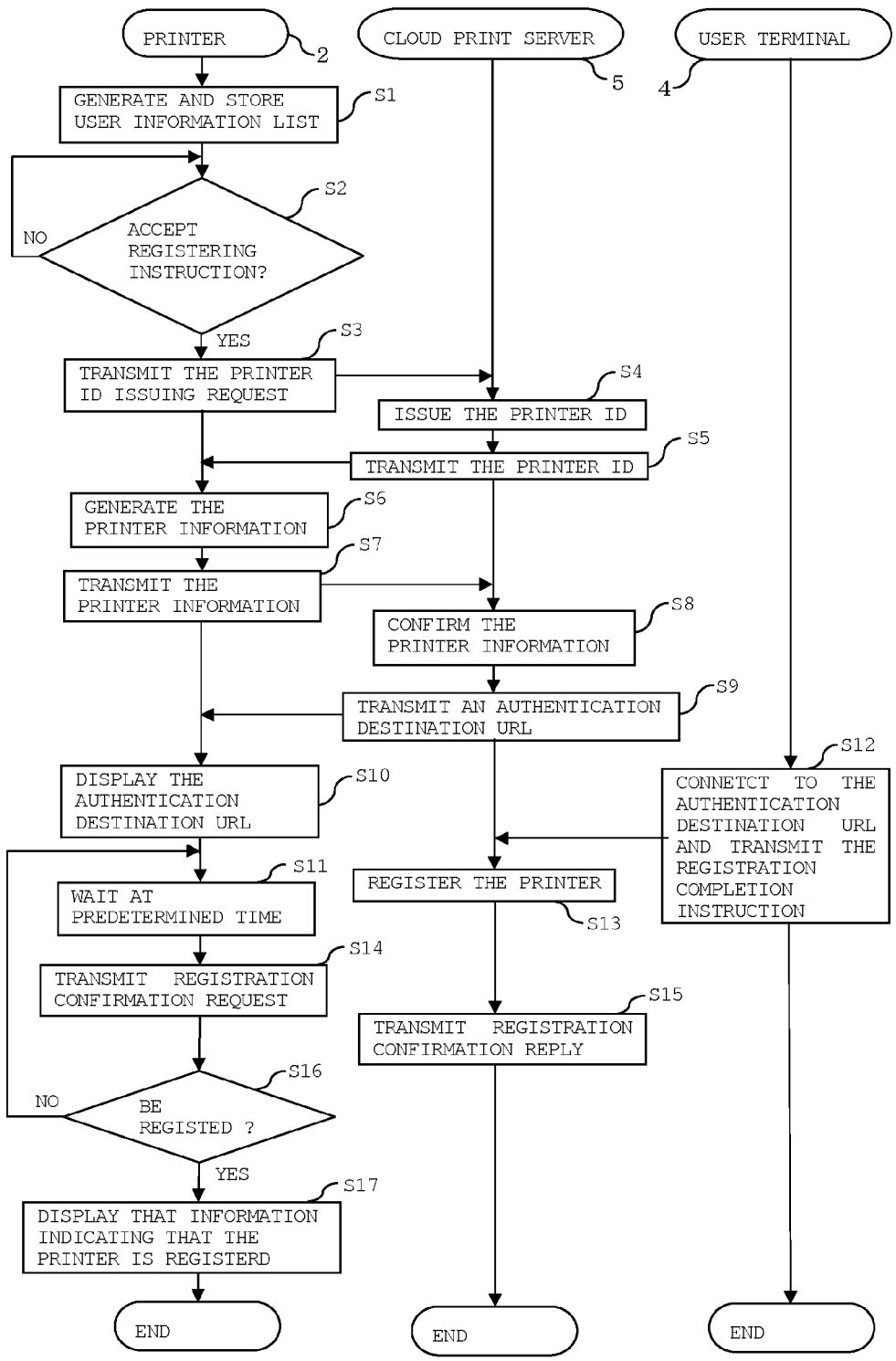

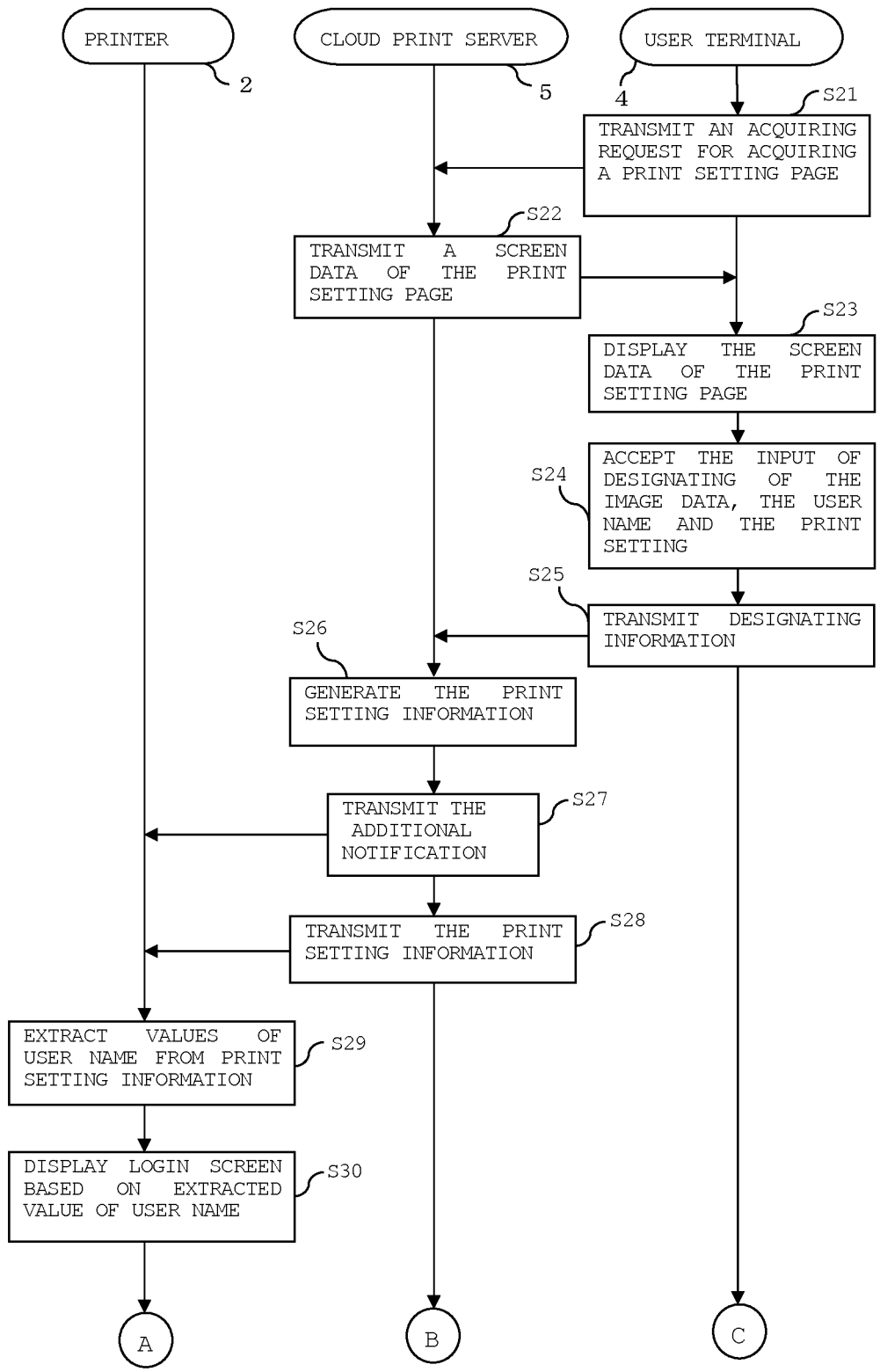

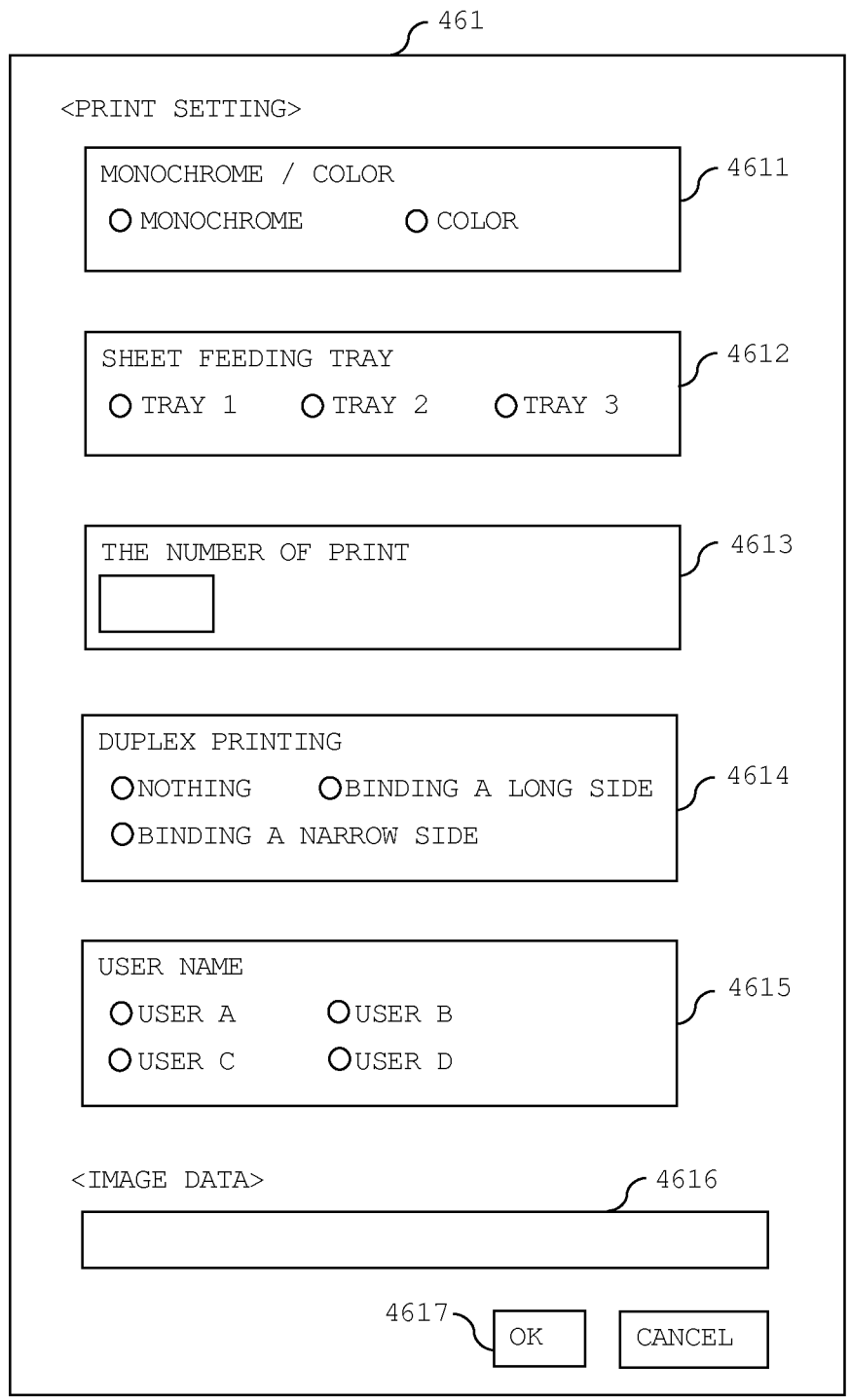

IMAGE FORMING SYSTEM AND IMAGE FORMING APPARATUS

CROSS REFERENCE TO RELATED APPLICATIONS

This application claims priority based on 35 USC 119 from prior Japanese Patent Application No. 2013-267503 filed on Dec. 25, 2013, the entire contents which are incorporated herein by reference.

BACKGROUND OF THE INVENTION

1. Field of the Invention

This application relates to an image forming system and an image forming apparatus.

2. Description of Related Art

In a conventional image forming system that includes a PC (Personal Computer), a server and a printer connected to a LAN (Local Area Network), the PC generates a print job including a user name and a password in cooperation with the printer driver installed to the PC. Then the PC transmits the print job to the server. Then the printer executes user authentication (see, for example, Japanese Laid-open Patent Publication No. 2012-190372).

In a conventional cloud print system that includes a client terminal, a server and a printer, the client terminal transmits an instruction concerning printing to the server. Then the server transmits a print job to the printer. Then the printer executes printing processing based on the print job (see, for example, Japanese Laid-open Patent Publication No. 2008-146465).

However, in such conventional techniques, a convenience is low.

SUMMARY OF THE INVENTION

According to an aspect of the disclosed invention, an image forming system includes a client apparatus, a server apparatus and an image forming apparatus communicably connected with each other. The client apparatus includes a designating unit designating identification information stored in the server apparatus and image data. The server apparatus includes a first memory unit storing the identification information and a transmitting unit transmitting the identification information and the image data designated by the designating unit to the image forming apparatus. The image forming apparatus includes a receiving unit receiving the identification information and the image data from the transmitting unit, an image forming unit outputting the image data on a sheet, a second memory unit storing first authentication information corresponding to the identification information, an accepting unit accepting second authentication information, a control unit restricting the image forming unit from outputting the image data on the sheet, when the second authentication information doesn't correspond to the first authentication information.

According to another aspect of the disclosed invention, an image forming apparatus includes a receiving unit receiving identification information and image data from an external apparatus, an image forming unit outputting the image data on a sheet, a memory unit storing first authentication information corresponding to the identification information, an accepting unit accepting second authentication information, a control unit restricting the image forming unit from outputting the image data on the sheet, when the second authentication information doesn't correspond to the first authentication information.

According to this invention, the convenience improves.

BRIEF DESCRIPTION OF THE DRAWINGS

In the attached drawings:

FIG. 3 is a schematic view showing a user information list according to the first embodiment;

FIG. 4 is a schematic view showing printer information according to the first embodiment;

FIG. 6 is a schematic view showing print setting information according to the first embodiment;

FIG. 8 is a flowchart showing Printer registering processing according to the first embodiment;

FIGS. 9A and 9B are flowcharts showing printing processing according to the first embodiment;

FIG. 10 is a schematic view showing a screen of print setting page according to the first embodiment;

DETAILED DESCRIPTION OF EMBODIMENTS

Hereinafter, preferred embodiments of the invention will be described with reference to the attached drawings.

1. First Embodiment

1-1. Overall Structure of a Cloud Print System

Figure 1:
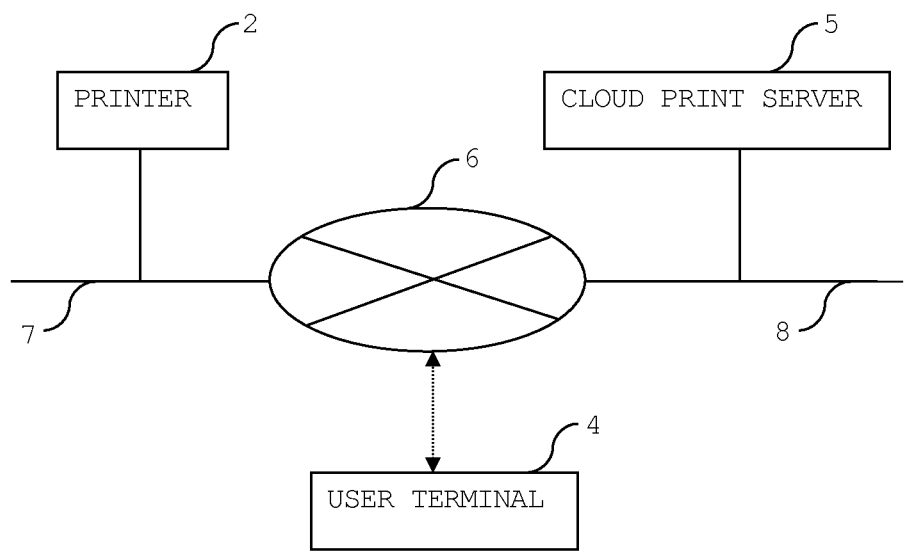
FIG. 1 is a schematic view showing a cloud print system according to a first embodiment.

As shown in FIG. 1, a cloud print system 1 as an image forming system may include a printer 2, a user terminal 4 and a cloud print server 5. The printer 2, the user terminal 4 and the cloud print server 5 are communicably connected to one another through an internet 6 as a communication network.

The cloud print server 5 registers the printer 2 by storing printer identification information to a predefined memory unit. The printer identification information indicates the printer 2 connected to the cloud print server 5 through the internet 6. The cloud print server 5 is in a state that the user terminal 4 can designate the printer 2 as an output destination through the internet 6, based on the stored printer identification information.

The user terminal 4 may be an information processing apparatus such as a mobile terminal, a smartphone, a notebook PC and a desktop PC. The user terminal 4 designates the printer 2 registered with the cloud print server 5 based on user operation. Then the user terminal 4 transmits an instruction of printing execution, which indicates that the designated printer 2 is the output destination, to the cloud print server 5.

When the cloud print server 5 receives the instruction of printing executing from the user terminal 4, the cloud print server 5 populates a print job corresponding to the instruction into a job queue 322. Then the cloud print server 5 transmits an additional notification which indicates that the print job is populated into the job queue 322, to the printer 2 designated as the output destination.

The printer 2 receives the additional notification from the cloud print server 5. Then the printer 2 receives the print job from the cloud print server 5. The printer 2 executes printing process based on the received print job.

1-2. Structure of the Printer

Figure 2:
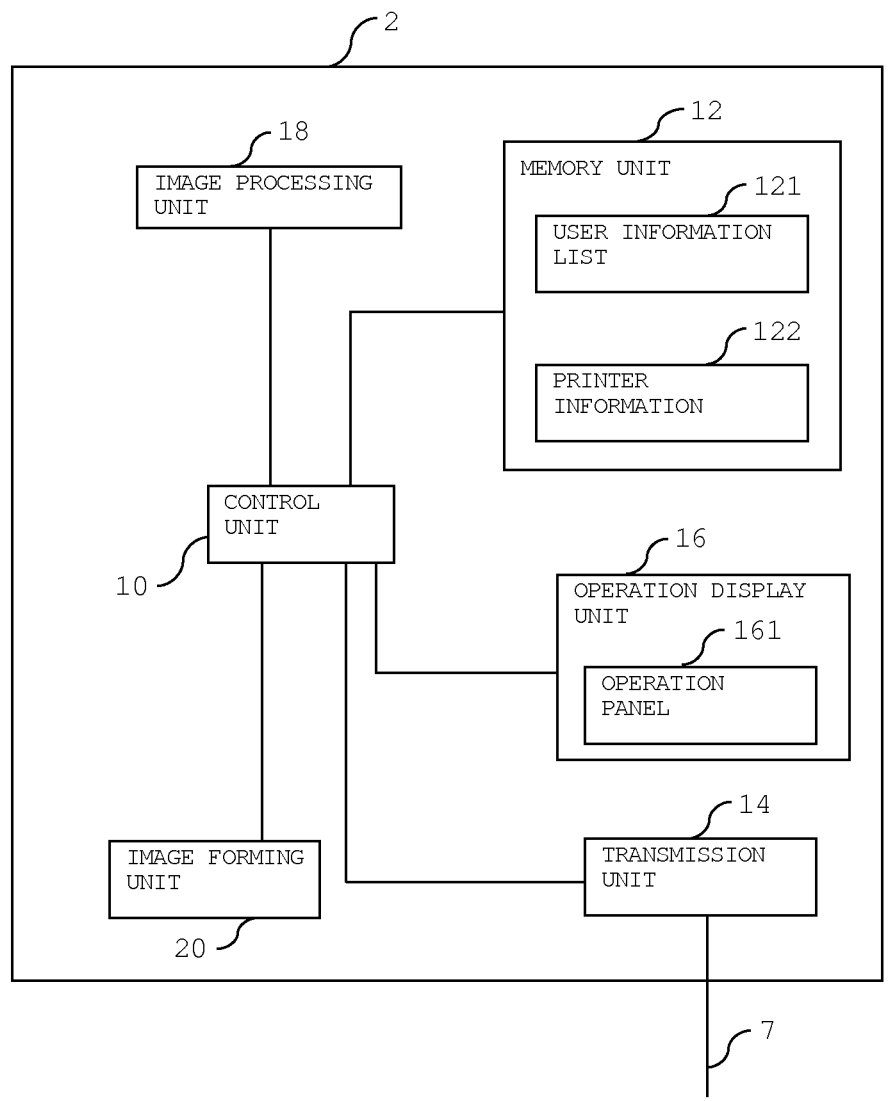
FIG. 2 is a block diagram showing a configuration of a printer according to the first embodiment.

As shown in FIG. 2, the printer 2 as an image forming apparatus may include a control unit 10, a memory unit 12, a transmission unit 14 (e.g., including a transmitter and a receiver), an operation display unit 16, an image processing unit 18 and an image forming unit 20 (i.e., a printing device). The control unit 10 may be a CPU (Central Processing Unit). The control unit 10 reads predefined programs from the memory unit 12. The control unit 10 executes various processes based on the predefined programs. The control unit 10 controls each unit (the memory unit 12, the transmission unit 14, the operation display unit 16, the image processing unit 18 and the image forming unit 20).

The transmission unit 14 may include, a network card. The transmission unit 14 is connected to the internet 6 through a LAN 7 and a gateway. The transmission unit 14 transmits data to the user terminal 4 and the cloud print server 5 through the internet 6. The transmission unit 14 receives data from the user terminal 4 and the cloud print server 5 through the internet 6.

The operation display unit 16 may include an operation panel 161 and an operation key. The operation panel 161 may include a LCD (Liquid Crystal Display) and a touch panel. The LCD is integrated with the touch panel. The operation panel 161 displays various setting screens and a login screen on the LCD based on instructions by the control unit 10. The operation panel 161 accepts an input (operation instruction) by user operation through the touch panel. The input may be, for example, the input of password in the login screen. After the operation display unit 16 accepts the operation instruction, the operation display unit 16 outputs the operation instruction to the control unit 10.

The memory unit 12 may be a ROM (Read Only Memory), a RAM (Random Access Memory), a hard disk drive and a flash memory. The memory unit 12 stores various programs. The memory unit 12 stores a user information list 121 shown in FIG. 3. The memory unit 12 stores printer information 122 shown in FIG. 4.

The user information list 121 indicates information about users who can use the printer 2, a password corresponding to the users and various restrictions on the printing corresponding to the users. The user information list 121 is previously input through the operation panel 161 by an administrator who manages the printer 2. Then the user information list 121 is previously stored in the memory unit 12. The memory unit 12 stores executable function information indicating executable function on the printer 2. The executable function information is written in the memory unit 12 at the time of shipping or manufacturing of the printer 2.

The user information list 121 includes one or more records, each of which includes an item of user name 1211, an item of a password 1212, an item of permission information 1213 and an item of the number of printing permission sheets 1214.

The user name 1211 is identification information that identifies a user who can use the printer 2. Namely, the user name 1211 is allocated to each user. The password 1212 is authentication information corresponding to the user name 1211. The password 1212 is used for authentication on the printer 2.

Here, the identification information is not limited to information to identify the user. For example, the identification may be information to identify an apparatus.

The permission information 1213 corresponds to the user name 1211. The permission information 1213 is print condition information indicating a print condition in which each user is permitted. A setting value of the item of the permission information 1213 corresponds to, for example, "printing is always permitted" or "only monochrome printing is permitted." The number of printing permission sheets 1214 is information corresponding to the user name 1211. The number of printing permission sheets 1214 is the print condition information indicating the maximum number of sheets for that printing is permitted during the predetermined period (for example, one month). Whenever printing is executed, the number of printing permission sheets 1214 is subtracted. When it is the next month, the number of printing permission sheets 1214 returns to a setting value before it is subtracted.

In first embodiment, for example, in the case that the setting value of the item of the user name 1211 corresponds to "user A," the setting values of the items of the password 1212, permission information 1213 and the number of printing permission sheets 1214 respectively corresponds to "abcd," "printing is always permitted" and "100."

The printer information 122 includes an item of printer name 1221, an item of printer ID 1222, an item of color 1223, an item of sheet feeding tray 1224, an item of the number of printing 1225, an item of duplex printing 1226 and an item of user name 1227. The item of color 1223, the item of sheet feeding tray 1224, the item of the number of printing 1225 and the item of duplex printing 1226 are print setting items that the printer 2 supports. When printing process is executed, the setting values corresponding to the each item are selectably displayed.

The printer name 1221 indicates a name of the printer 2 in the cloud print system 1. The setting value of the item of the printer name 1221 is set in "printer-123456." The printer ID 1222 is printer identification information indicating the printer 2 on the cloud print system 1. The setting value of the item of the printer ID 1222 is set in "550e8400-e29b-41d4-a716-446655440000." The setting value of the item of the printer ID 1222 is issued by the cloud print server 5.

The color 1223 indicates a color setting in which the printer 2 can print an object. The setting value of the item of color 1223 is either "monochrome" or "color." Namely the item of color 1223 has two setting values. The sheet feeding tray 1224 indicates kind of a sheet feeding tray that the printer 2 can use. The setting value of the item of the sheet feeding tray 1224 is either "tray1," "tray2," or "MP tray." Namely the item of the sheet feeding tray 1224 has three setting values. The number of print 1225 indicates the number of the sheet that the printer 2 can print for one print job. The setting value of the item of the number of print 1225 is either "100" from "1." Namely the item of the number of print 1225 has 100 setting values. The duplex printing 1226 indicates the setting of duplex printing in which the printer 2 can print. The setting value of the item of the duplex printing 1226 is either "nothing," "binding a long side," or "binding a narrow side." Namely the item of the duplex printing 1226 has 3 setting values. The user name 1227 indicates the user who can use the printer 2. The setting value of the item of the user name 1227 is either "user A", "user B," "user C," or "user D." Namely the item of the user name 1227 has 4 setting values. The setting values for the item of the user name 1227, i.e., "user A," "user B," "user C," and "user D," respectively correspond to the setting values set for the item of the user name 1211 in the user information list 121.

The control unit 10 generates the printer information 122 when the cloud print server 5 registers the printer 2 in a printer registering process. Specifically, the control unit 10 receives printer ID from the cloud print server 5. The control unit 10 reads the user information list 121 and the executable function information from the memory unit 12. The control unit 10 sets the setting values of the item of the printer name 1221, the color 1223, the sheet feeding tray 1224, the number of print 1225 and the duplex printing 1226 of the printer information 122 based on the read executable function information. The control unit 10 sets the setting value of the item of printer ID 1222 as the received printer ID. The control unit 10 reads the setting values of the item of each record "the user name 1221" in the read user information list 121. Then the control unit 10 sets the setting values of the item of user name 1227 as the read setting values.

Then the control unit 10 writes the generated printer information 122 to the memory unit 12. The control unit 10 transmits the generated printer information 122 to the cloud print server 5. The cloud print server 5 stores the transmitted printer information 122 when the cloud print server 5 registers the printer 2.

According to the above description, in a printing processing, the user terminal 4 selectably displays the plural setting values of the items of the user name 1227, "user A," "user B," "user C" and "user D," to an operation display unit 46 through WEB browser 401.

The image processing unit 18 converts the image data included by the print job that is received from the cloud print server 5 through the internet 6, into print data. In other words, the image processing unit 18 rasterizes the image data included by the print job. The image forming unit 20 prints the image based on the print data on a sheet (for example, the paper).

1-3. Structure of the Cloud Print Server

Figure 5:
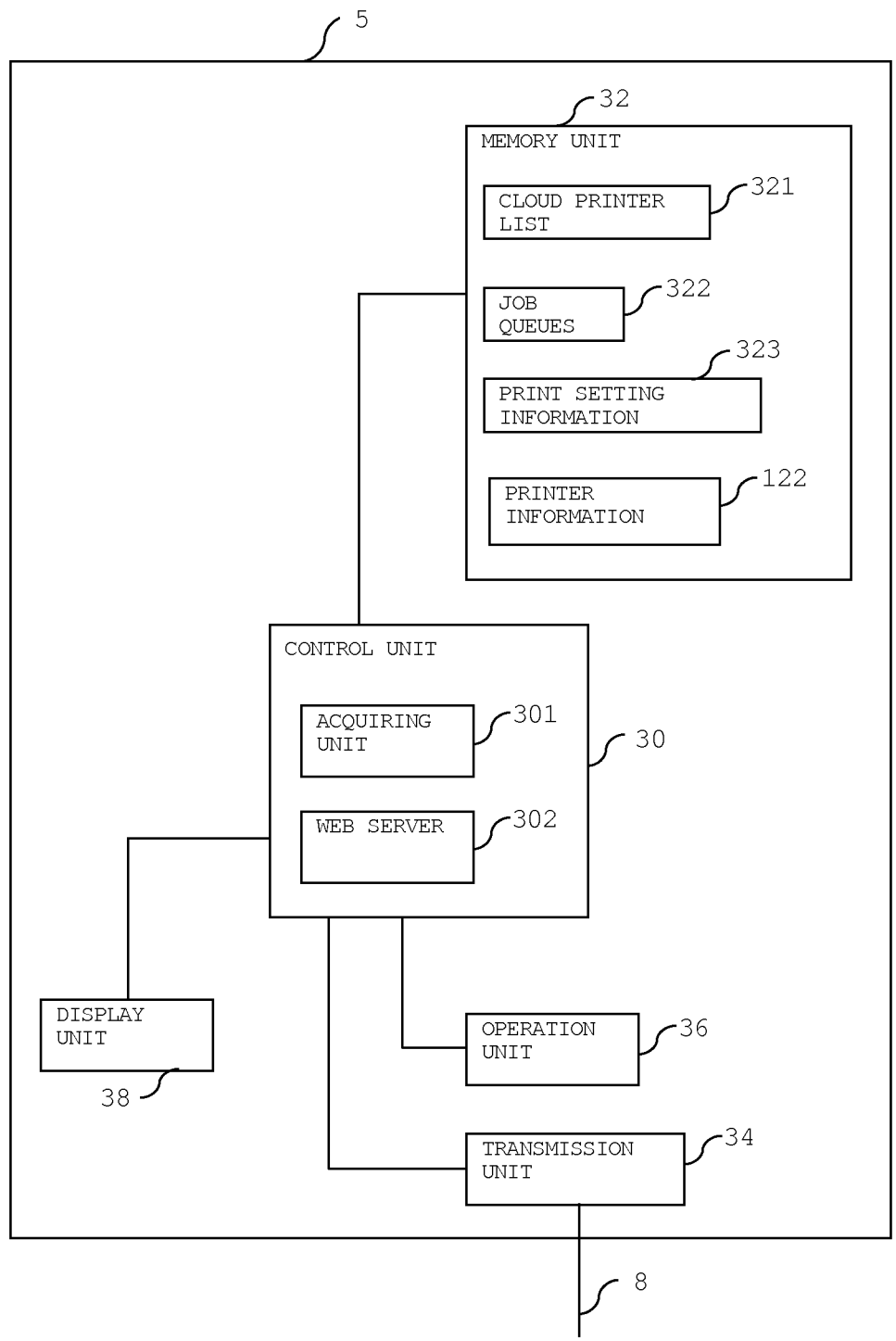
FIG. 5 is a block diagram showing a configuration of a cloud print server according to the first embodiment.

As shown in FIG. 5, the cloud print server 5 as the server apparatus may include a control unit 30, a memory unit 32, a transmission unit 34 (e.g., including a transmitter and a receiver), an operation unit 36 and a display unit 38. The control unit 30 may be a CPU. The control unit 30 reads predefined programs from memory unit 32. The control unit 30 executes various processes based on the predefined programs. The control unit 30 controls each unit (the memory unit 32, the transmission unit 34, the operation unit 36, the display unit 38). The control unit 30 may include an acquiring unit 301 and a WEB server unit 302.

The transmission unit 34 may be, for example, a network card. The transmission unit 34 is connected to the internet 6 through a LAN 8 and a gateway. The transmission unit 34 transmits data to the printer 2 and the user terminal 4 through the internet 6. The transmission unit 34 receives data from the printer 2 and the user terminal 4 through the internet 6.

When the control unit 30 receives printer ID issuing request from the printer 2 through the transmission unit 34, the control unit 30 issues a printer ID. The control unit 30 transmits the printer ID to the printer 2 through the transmission unit 34.

The control unit 30 correlates the printer ID with an account of the administrator of the printer 2 corresponding to the printer ID. The control unit 30 writes the printer ID and the account of the administrator to the memory unit 32. Specifically, the control unit 30 correlates the printer ID with the account of the administrator. Then the control unit 30 adds a record that includes the printer ID and the account of the administrator to a cloud printer list 321. In this way, the control unit 30 registers the printer 2 to the cloud print server 5. The printer 2 that is registered to the cloud print server 5 can be utilized in the cloud print system 1. The control unit 30 correlates the printer information 122 received from the printer 2 with the record added to the cloud printer list 321.

The memory unit 32 may be a ROM, a RAM, a hard disk drive and a flash memory. The memory unit 32 stores the cloud printer list 321. The memory unit 32 stores the job queues 322 therein. Each of the job queues 322 corresponds to the printer ID of the printer listed in the cloud printer list 321. The job queues 322 accumulate the print job that corresponds to the print ID.

The control unit 30 receives the printer information 122 from the printer 2 though the transmission unit 34. The control unit 30 writes the printer information 122 to the memory unit 32.

A WEB server 302 provides various display image data to a WEB browser 401 according to a request from the WEB browser 401 of the user terminal 4. The control unit 30 reads the printer information 122 corresponding to the printer 2 from the memory unit 32 when the WEB browser 401 accesses print setting page of the printer 2 in the WEB server 302. The control unit 30 controls the WEB server 302 to generate display image data of the print setting page based on the printer information 122. The WEB server 302 provides the generated display image data of the print setting page to the WEB browser 401. The WEB browser 401 displays an image of the print setting page based on the provided image display data through the operating displaying unit 46. Then the control unit 30 generates print setting information 323 shown in FIG. 6 based on designating information received through the WEB browser 401. Then the control unit 30 transmits the generated print setting information 323 to the printer 2 through the transmission unit 34.

The acquiring unit 301 acquires image data designated by the designating information. If the designated image data is stored to the memory unit 32 of the cloud print server 5, the acquiring unit 301 reads the designated image data from the memory unit 32. If the designated image data is stored to the memory unit 42 of the user terminal 4, the acquiring unit 301 acquires the designated image data from the memory unit 42 through the transmission unit 44 and the transmission unit 34.

The print setting information 323 includes an item of color 3231, an item of sheet feeding tray 3232, an item of the number of printing 3233, an item of duplex printing 3234 and an item of user name 3235. The setting value of each item is designated based on user operation through WEB browser 401 of the user terminal 4.

Specifically, the color 3231 indicates color setting in this printing process. The setting value of item of color 3231 is "color." The sheet feeding tray 3232 indicates kind of the sheet feeding tray in this printing process. The setting value of item of sheet feeding tray 3232 is "tray1." The number of print 3233 indicates the number of the sheet in this printing process. The setting value of item of the number of print 3233 is "1". The duplex printing 3234 indicates the setting of duplex printing in this printing process. The setting value of item of the duplex printing 3234 is "nothing." The user name 3235 indicates the user who instructs this printing process. The setting value of item of the user name 3235 is "user A."

The operation unit 36 may be, for example, a keyboard and a mouse. The operation unit 36 accepts an input by the operation of a user. The display unit 38 may be, for example, a liquid crystal display. The display unit 38 displays an operation screen.

1-4. Structure of the User Terminal

Figure 7:
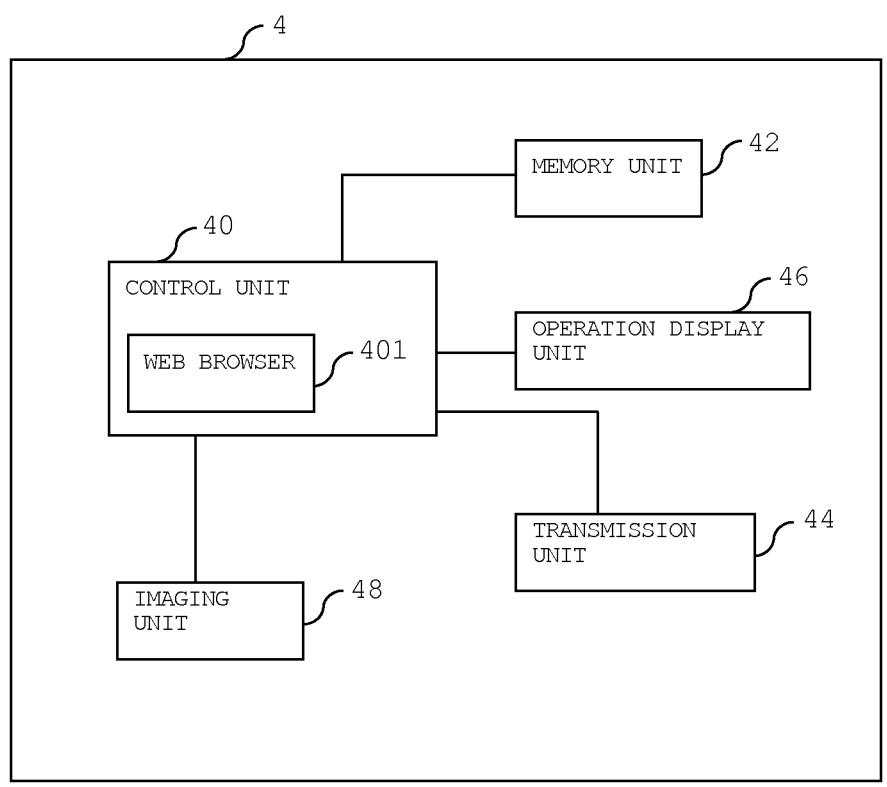
FIG. 7 is a block diagram showing a configuration of a user terminal according to the first embodiment.

As shown in FIG. 7, the user terminal 4 as the client apparatus may include a control unit 40, a memory unit 42, a transmission unit 44, an operation display unit 46 and an imaging unit 48. The control unit 40 may be a CPU. The control unit 40 reads predefined programs from the memory unit 42. The control unit 40 executes various processes based on the predefined programs. The control unit 40 controls each unit (the memory unit 42, the transmission unit 44, the operation display unit 46 and the imaging unit 48). The control unit 40 may include a WEB browser 401.

The transmission unit 44 may be, for example, an antenna. The transmission unit 44 is connected to the internet 6. The transmission unit 44 transmits data to printer 2 and the cloud print server 5 through the internet 6. The transmission unit 44 receives data from the printer 2 and the cloud print server 5 through the internet 6.

The memory unit 42 may be a ROM, a RAM, a hard disk drive and a flash memory. The memory unit 12 stores various programs. The memory unit 42 stores image data. The control unit 40 reads the image data from the memory unit 42. Then the control unit 40 transmits the image data to the cloud print server 5. The control unit 40 designates a printer of the printing destination. The control unit 40 designates the user name who instructs printing processing. The control unit 40 designates image data. The control unit 40 designates various print setting. The control unit 40 generates designating information based on these designations. The control unit 40 transmits the generated designating information to cloud print server 5.

The operation display unit 46 may be, for example, a LCD and a touch panel. The LCD is integrated with the touch panel. The operation display unit 46 displays various screens on the LCD based on instruction by the control unit 40. The operation display unit 46 accepts an input (operation instruction) by user operation through the touch panel. The operation display unit 46 displays various screens to LCD through WEB browser 401. The operation display unit 46 accepts input by user operation in cooperation with the WEB browser 401.

The imaging unit 48 may be a camera. When the operation display unit 46 accepts the input based on user operation, the imaging unit 48 photographs a subject. Then the imaging unit 48 generates the image data. The imaging unit 48 writes the generated image data to the memory unit 42. When the subject is a two dimensional bar-code, the control unit 40 analyzes the generated image data of the two dimensional bar-code.

1-5. Printer Registering Process

The printer registering process is shown in FIG. 8. The printer registering process is the process in which the printer 2 is registered to the cloud print server 5 in the cloud print system 1.

In step S1, the control unit 10 of the printer 2 generates the user information list 121 shown in FIG. 3. The control unit 10 writes the generated user information list 121 to the memory unit 12. Also, process in step S1 may be executed prior to the printer registering process.

In step S2, the control unit 10 of the printer 2 waits for the accepting of the operation instruction (registering instruction) in the operation displaying unit 16 (step S2; NO). When the control unit 10 detects the accepting of the operation instruction, the control unit 10 moves the process to step S3 (step S2; YES).

In step S3, the control unit 10 of the printer 2 transmits the printer ID issuing request to the cloud print server 5 through the transmission unit 14.

The control unit 30 of the cloud print server 5 receives the printer ID issuing request from the printer 2 through the transmission unit 34. Then in step S4, the control unit 30 issues a printer ID based on the printer ID issuing request. In step S5, the control unit 30 transmits the issued printer ID to the printer 2 through the transmission unit 34.

The control unit 10 of the printer 2 receives the printer ID through the transmission unit 14. Then in step S6, the control unit 10 generates the printer information 122 shown in FIG. 4. Specifically, the control unit 10 reads the user information list 121 and the executable function information from the memory unit 12. Then the control unit 10 sets the setting values of the item of the printer name 1221, the color 1223, the sheet feeding tray 1224, the number of print 1225 and the duplex printing 1226 of the printer information 122 based on the read executable function information. The control unit 10 sets setting value of the item of printer ID 1222 as the received the printer ID. The control unit 10 retrieves the setting values for the item of the user name 1221 from the user information list 121, and then adds the retrieved setting values to the printer information as the setting values for the item of the user name 1227.

In step S7, the control unit 10 transmits the generated printer information 122 to the cloud print server 5 through the transmitting unit 14.

The control unit 30 of the cloud print server 5 receives the printer information 122 through the transmitting unit 34. In step S8, the control unit 30 determines whether the contents of data of the printer information 122 satisfy a predetermined condition. Namely, the control unit 30 determines whether mention contents don't have deficiency. When the control unit 30 determines that contents of data of the printer information 122 satisfy the predetermined condition, the control unit 30 moves the process to step S9. In step S9, the control unit 30 transmits an authentication destination URL (Uniform Resource Locator) indicating WEB page of the HTML form (printer registering WEB page) to the printer 2 through the transmitting unit 34.

The control unit 10 of the printer 2 receives the authentication destination URL through the transmitting unit 14. Then the control unit 10 generates the two dimensional bar-code indicating the authentication destination URL. Then in step 10, the control unit 10 controls the operating displaying unit 16 to display the two dimensional bar-code. Then in step 11, the control unit 10 waits for predetermined time to elapse.

While the control unit 10 waits, a user operates the user terminal 4 so that the imaging unit 48 of the user terminal 4 photographs the two dimensional bar-code displayed by operating displaying unit 16. Namely, the imaging unit 48 photographs the two dimensional bar-code based on the user operation. The control unit 40 of the user terminal 4 analyzes the two dimensional bar-code. Then the control unit 40 acquires the authentication destination URL. The control unit 40 transmits an acquiring request for acquiring WEB page indicated by the authentication destination URL to WEB server 302 of the cloud print server 5 through the WEB browser 401. The control unit 40 acquires screen data of a printer registering page from the WEB server 302. The control unit 40 controls the operation displaying unit 46 to display the screen of the printer registering page through the WEB browser 401.

Then the control unit 40 accepts an input of registration completion instruction by an user operation from the operating displaying unit 46 through the WEB browser 401. The control unit 40 transmits the registration completion instruction to the cloud print server 5 through the transmitting unit 44. Namely, the control unit 40 connects to the authentication destination URL. Then the control unit 40 transmits the registration completion instruction to the cloud print server 5 (step S12).

The control unit 30 of the cloud print server 5 receives the registration completion instruction from the user terminal through the transmitting unit 34. Then in step 13, the control unit 30 registers the printer 2 to the cloud print server 5. Specifically, the control unit 30 associates the printer ID with an account of the printer manager. Then the control unit 30 adds a record including the printer ID and the account of the printer manager. Then the control unit 30 associates the added record with the printer information 122 transmitted in step S7.

On the other hand, in step S14, the control unit 10 of the printer 2 transmits registration confirmation request for confirming whether the printer 2 has been registered to the cloud print server 5 to the cloud server 5 through the transmitting unit 14.

The control unit 30 of the cloud print server 5 receives the registration confirmation request from the printer 2 through the transmitting unit 34. Then in step S15, when the printer 2 is registered to the cloud print server 5, the control unit 30 transmits registration confirmation reply that indicates the above information through the transmitting unit 34. On the other hand, when the printer 2 is not registered to the cloud print server 5, the control unit 30 transmits registration confirmation reply that indicates the above information through the transmitting unit 34.

The control unit 10 of the printer 2 receives the registration confirmation reply from the cloud print server 5 through the transmitting unit 14. In step 16, the control unit 10 refers to the registration confirmation reply. The control unit 10 determines whether the printer 2 is registered to the cloud print server 5. When the control unit 10 determines that the printer 2 is not registered to the cloud print server 5 (step S16; NO), the control unit 10 moves the process to step S11. Then the control unit 10 waits for predetermined time to elapse.

On the other hand, when the control unit 10 determines that the printer 2 is registered to the cloud print list 321 (step S16; YES), the control unit 10 moves the process to step S17. In step S17, the control unit 10 displays the information indicating that the printer 2 is registered to the cloud printer server 5 to the operation displaying unit 16. Then the printer registering process is completed.

1-6. Printing Process

Figure 9B:
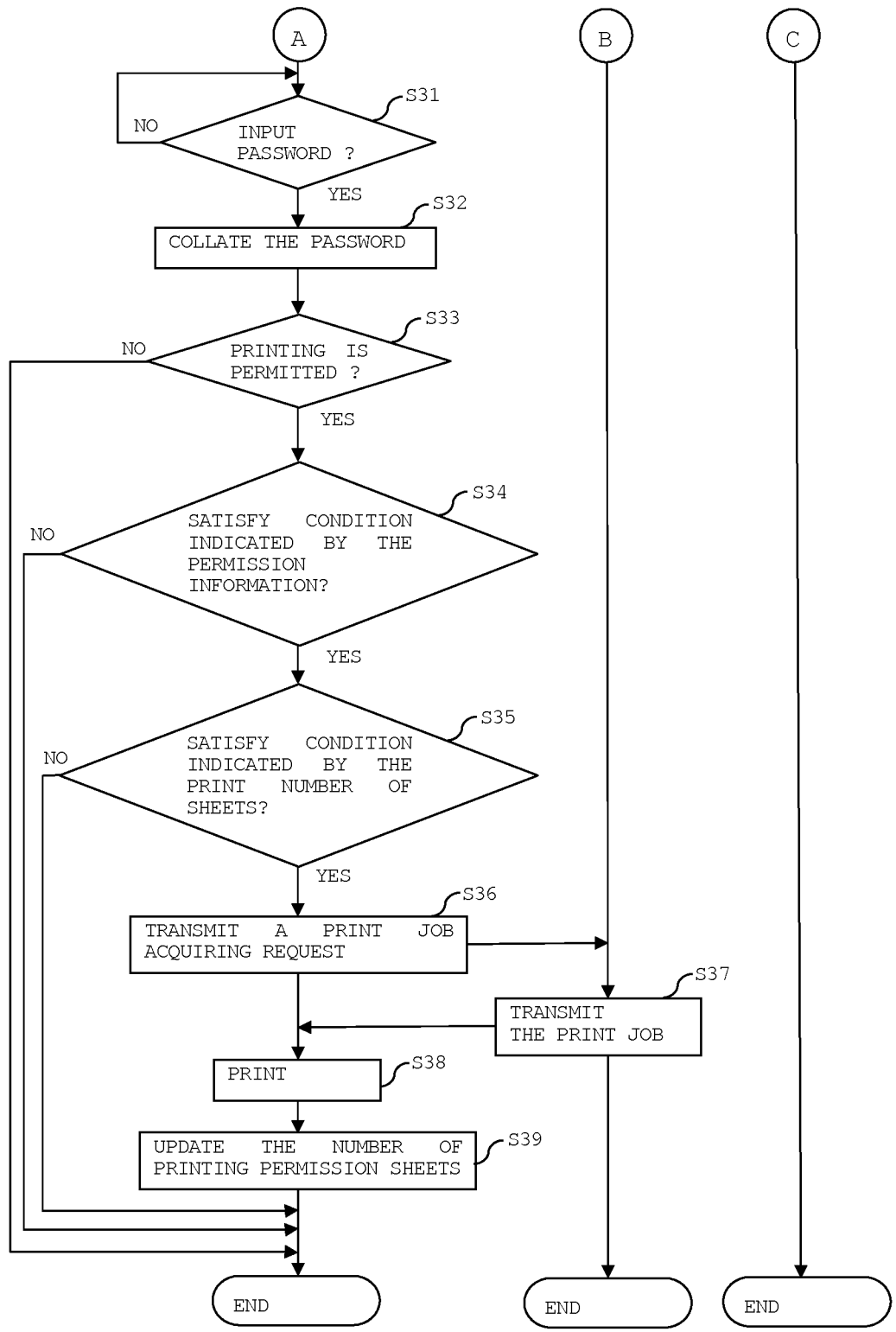

The printing process is shown in FIGS. 9A and 9B. The printing process is executed in the cloud print system 1. The user terminal 4 designates image data and print setting to the cloud print server 5 based on user operation. The cloud print server 5 transmits a print job based on the designated image data and the designated print setting to the printer 2. When the printer 2 satisfies a prescribed condition, the printer 2 executes the printing process based on the print job.

In step 21, the control unit 40 of the user terminal 4 transmits an acquiring request for acquiring a print setting page to the cloud print server 5. Specifically, the control unit 40 connects the WEB page about a cloud print of WEB server 302 based on user operation in the operating displaying unit 46. The control unit 40 designates the printer 2 as a print destination (Namely, printer name "printer-123456" in FIG. 4) based on user operation in the operation displaying unit 46 through WEB browser 401. The control unit 40 transmits the acquiring request for acquiring the print setting page about the designated printer 2 to the cloud print server 5.

In step 22, the WEB server 302 of the cloud print server 5 transmits a screen data of the print setting page about the printer 2 to the user terminal 4 according to the acquiring request. The screen data is selectably displayed setting values of some of items of the printer information 122 on WEB browser 401.

The control unit 40 received the screen data of the print setting page about the printer 2 from the cloud print server 5.

In step S23, the control unit 40 displays the screen of print setting page 461 to the operation displaying unit 46 through the WEB browser 401.

The screen of print setting page 461 is shown in FIG. 10.

The print setting page 461 includes an instruction reception unit 4611 that accepts the input of selection instruction that selects the setting value for color 1223 from the group of "monochrome" and "color."

The print setting page 461 includes an instruction reception unit 4612 that accepts the input of selection instruction that selects the setting value for sheet feeding tray 1224 from the group of "tray1," "tray2" and "MP tray."

The print setting page 461 includes an instruction reception unit 4613 that accepts the input of selection instruction that selects the setting value for the number of print 1225 from the group of "1 to 999."

The print setting page 461 includes an instruction reception unit 4614 that accepts the input of selection instruction that selects the setting value for the duplex printing 1226 from group of "nothing," "binding a long side" and "binding a narrow side."

The print setting page 461 includes an instruction reception unit 4615 that accepts the input of selection instruction that selects the setting value for the user name 1227 from group of "user A," "user B," "user C" and "user D."

The print setting page 461 includes an instruction reception unit 4616 that accepts input for designating image data.

The print setting page 461 includes an instruction reception unit 4617 that accepts input for generating designation information based on the input of designation accepted from the instruction reception units 4611 to 4616 and transmitting the generated designation information to the cloud print server 5.

In step 24, the control unit 40 of the user terminal 4 accepts the input of designation of image data based on user operation from the instruction reception unit 4616 in the print setting page 461 through the operating displaying unit 46.

Also, in step 24, the control unit 40 accepts the input of designation of print setting based on user operation from the instruction reception units 4611 to 4615 in the print setting page 461 through the operation displaying unit 46. For example, the control unit 40 accepts the input of selecting instruction for selecting one of the plural setting values of the item of color 1223 of the printer information 122, "monochrome" and "color." The control unit 40 accepts the input of selecting instruction for selecting one of the plural setting values of the item of sheet feeding tray 1224 of the printer information 122, "tray1," "tray2" and "MP tray." The control unit 40 accepts the input of selecting instruction for selecting one of the plural setting values of the item of the number of printing 1225 of printer information 122, "1 to 999." The control unit 40 accepts the input of selection instruction for selecting one of the plural setting values of the item of the duplex printing 1226 of printer information 122, "noting," "binding a long side" and "binding a narrow side." The control unit 40 accepts the input of selection instruction for selecting one of the plural setting values of the item of the user name 1227 of printer information 122, "user A," "user B," "user C" and "user D."

Then, in step S25, the control unit 40 accepts the input of transmission instruction for transmitting the designating information based on user operation from the instruction reception unit 4617 in the print setting page 461 through the operating displaying unit 46. When the control unit 40 accepts the input of transmission instruction, the control unit 40 generates the designating information that indicates the image data and the print setting such as the user name designated from the instruction reception units 4611 to 4616. Then the control unit 40 transmits the generated designating information to the cloud print server 5.

When the image data stored in the memory unit 42 is designated, the control unit 40 transmits the designating information and the image data to the cloud print server 5.

When the image data stored in the cloud print server 5 is designated, the control unit 40 transmits only the designating information to the cloud print server 5.

The control unit 30 of the cloud print server 5 receives the designating information from the user terminal 4 through the transmitting unit 34. In step 26, the control unit 30 generates the print setting information 323 based on the designating information.

For example, in step 24, when the control unit 40 accepts input of designation that the color 1223 is "color," the sheet feeding tray 1224 is "tray1," the number of print 1225 is "1," the duplex printing 1226 is "noting," the user name 1227 is "user A," the print setting information 323 as shown in FIG. 6 is generated.

The acquiring unit 301 acquires the image data designated by the designating information.

When the image data stored in the memory unit 32 is designated, the acquiring unit 301 read the image data from the memory unit 32 and the acquiring unit 301 acquires the image data.

On the other hand, when the image data stored in the memory unit 42, the transmitting unit 34 receives the image data from the user terminal 4. Then the acquiring unit 301 acquires the image data from the transmitting unit 34.

The control unit 30 generates the print job that includes the print setting information 323 and the image data acquired by the acquiring unit 301. The control unit 30 stores the generated print job to the job queue 322 corresponding to the printer 2.

In step S27, the control unit 30 of the cloud server 5 transmits the additional notification which indicates that the print job is populated into the job queue 322 corresponding to the printer 2 to the printer 2 through the transmission unit 34.

In step S28, the control unit 30 transmits the print setting information 323 generated in step S26 to the printer 2 through the transmission unit 34.

Figure 11:
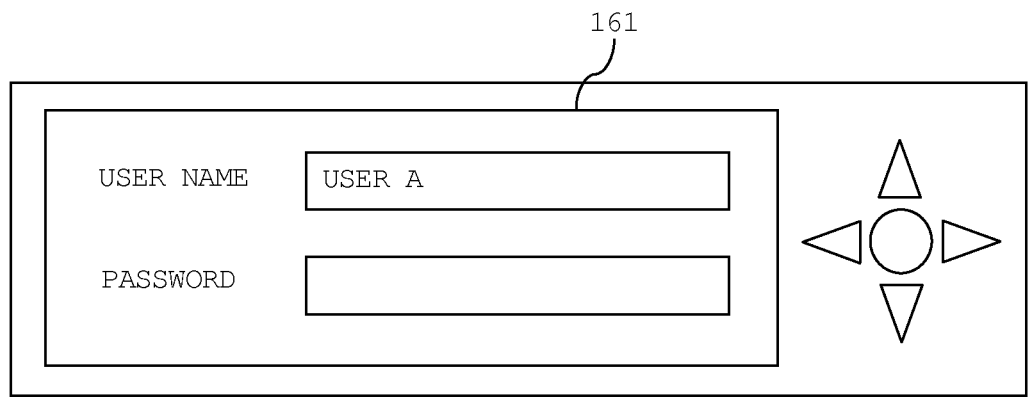
FIG. 11 is a schematic view showing a login screen according to the first embodiment.

The control unit 10 of the printer 2 receives the additional notification and the print setting information 323 from the cloud server 5 through the transmission unit 14. In step S29, the control unit 10 extracts the setting value "user A" of the item of user name 3235 of the print setting information 323. In step S30, the control unit 10 controls the operation panel 161 of the operating displaying unit 16 to display a login screen 1611 shown in FIG. 11.

The login screen 1611 includes a user name displaying unit 1612 and a password input unit 1613. The user name displaying unit 1612 displays the setting value "user A" extracted in step S25. The password input unit 1613 is a region for inputting a password.

In step S31, the control unit 10 of the printer 2 waits for the password to be inputted to the password input unit 1613 and an instruction of the print start to be inputted to the operation panel 161 (step S31; NO). When the control unit 10 detects the input of the password and the input of the instruction of the print start, the control unit 10 moves the process to step S32 (step S31; YES).

In step S32, the control unit 10 of the printer 2 collates the password that is inputted to the password input unit 1613. Then the control unit 10 moves the process to step S33. Specifically, the control unit 10 refers the items of user name 1211 of the user information list 121. Then the control unit 10 extracts a record of the user information list 121 corresponding to the setting value "user A" extracted in step S29. The control unit 10 compares the setting value of the password 1212 of the extracted record with the setting value of the password inputted to the password inputting unit 1613. Then the control unit 10 determines if each password is corresponding.

In step S33, when each password is corresponding, the control unit 10 determines that the print is permitted. Then the control unit 10 moves process to step S34 (step S33; YES).

This means that because the user who inputs the password to the printer 2 is authenticated as the user designated at the user terminal 4, the print output at the printer 2 is permitted.

On the other hand, when each password isn't corresponding, the control unit 10 determines that the print isn't permitted. Then the control unit 10 restricts the printing to the sheet by the image forming unit 20. For example, the control unit 10 inhibits the print to the sheet. Then the control unit 10 controls operation display unit 16 to display information about the restriction.

This means that because the user who inputs the password to the printer 2 isn't authenticated as the user designated at the user terminal 4, the print output at the printer 2 is prohibited.

In step S34, the control unit 10 determines whether the print condition at this time satisfies the condition indicated by the permission information. Specifically, the control unit 10 reads the setting value "printing is always permitted" of the permission information 1213 of the record of the user information list 121 that has the setting values "user A" of the user name 1211. The control unit 10 reads the setting values "color," "tray1" and "noting" of the color 3231, the sheet feeding tray 3232, the duplex printing 3234 of the print setting information 323 transmitted from the cloud print server 5. Then the control unit 10 determines whether each setting value read from the print setting information 323 satisfy the condition as the setting values of the permission information 1213. This time, because the setting value of the permission information 1213 is "printing is always permitted," the control unit 10 determines that the print condition is satisfied.

When the control unit 10 determines that the print condition is satisfied, namely the condition of the permission information is satisfied (step S34; YES), the control unit 10 moves process to step S35. On the other hands, when the control unit 10 determines that the print condition isn't satisfied (step S34; NO), the control unit 10 controls operation display unit 16 to display the information not to satisfy the print condition. Then the control unit 10 finished the process. This time, the print process isn't executed.

In step 35, the control unit 10 determines whether the print number of sheets is not more than the print number of sheets indicated the number of permitted sheet. Specifically, the control unit 10 reads the setting values "100" of the number of printing permission sheets 1214 of the record of the user information list 121 that has the setting values "user A" of the user name 121. The control unit 10 reads the setting value "1" of the number of print 3233 of the print setting information 323 transmitted from the cloud print server 5. Then the control unit 10 determines whether the setting value of the number of print 3233 is not more than the number of printing permission sheets 1214. This time, the setting values of the number of print 3233 is "1." And the setting value of the number of printing permission sheets 1214 is "100." So the control unit 10 determines that the print number of sheets is not more than the print number of permitted sheet.

When the control unit 10 determines that the condition of the number of permitted sheet is satisfied (step S35; YES), the control unit 10 moves process to step S36. On the other hands, when the control unit 10 determines that the condition of the number of permitted sheet isn't satisfied (step S35; NO), the control unit 10 controls operation display unit 16 to display the information not to satisfy the condition of the number of permitted sheet. This time, the print process isn't executed.

In step 36, the control unit 10 transmits a print job acquiring request to the cloud print server 5 through the transmitting unit 14.

The control unit 30 of the cloud print server 5 receives the print job acquiring request from the printer 2 through the transmitting unit 34. Then the control unit 30 acquires the print job from the print job queue 322 corresponding to the print 2. Then In step S37, the control unit 30 transmits the acquired print job to the printer 2 through the transmitting unit 34.

The control unit 10 of the printer 2 receives the print job from the cloud print server 5 through the transmitting unit 14. In step S38, the image processing unit 18 of the printer 2 converts image data included in the print job into the print data. Then the image forming unit 20 prints the image based on the print data on the sheet.

In step S39, the control unit 10 of the printer 2 subtracts the setting value of the number of print 3233 of the print setting information 323 transmitted from the cloud server 5 from the setting value of the number of printing permission sheets 1214 of the record of the user information list 121 that has the setting value "user A" of the user name 1211. Then the control unit 10 updates the setting value of the number of printing permission sheets 1214 of record of the user information list 121 that has the setting value "user A" of the user name 1211. Specifically, the control unit 10 subtracts the setting value "1" of the number of print 3233 from setting value "100" of the number of printing permission sheets 1214. Then the control unit 10 updates setting value of the number of printing permission sheets 1214 "100" to "99."

1-7. Advantageous Effect

According to first embodiment of the disclosed invention, even when the printer driver is not installed to the user terminal 4, the certification printing can be executed. So the security improves. And output restriction of the print number of sheets of each user is enabled. Using function restriction of the print of each user is enabled.

In conventional cloud print system, there is the threat that when there is a user terminal at position apart from a printer, the malicious user different from the user operating at the user terminal obtains the paper outputted at the printer.

But, in cloud print system 1, the printer 2 accepts a password. Then the printer 2 authenticates the user. When the result of the authentication is "OK," the printer 2 executes output of printing. Therefore, the cloud print system 1 prevents that the printed paper is left. And security improves.

And user A operates at user terminal. The user A selects user B at the print setting page 461. Then the user B inputs own password. Then the user B obtains the paper outputted at the printer 4. Therefore, the user A can ask only user B to go for the paper of the user A.

The print instruction terminal in installed a printer driver sends a print job including a user name and a password to printer not through the cloud print server 5. In this case, the printer 2 in the first embodiment stores the user information list 121. Therefore, even when the printer 2 receives such the print job, the printer 2 can execute the authentication printing by using the user name and the password stored in the user information list 121. Namely, the printer 2 collates the user name included by the received print job with the user name stored in the user information list 121. And the printer 2 collates the password included by the received print job with the password stored in the user information list 121.

The cloud print system 1 in the first embodiment includes the user terminal 4, the cloud print server 5 and the printer 2. And the user terminal 4, the cloud print server 5 and the printer 2 are communicably connected to one another. The cloud print server 5 stores the printer information 122 including the user name. And the user terminal 4 designates an image data and a user name stored in the cloud print server 5. Then the cloud print server 5 transmits the designated image data and the designated user name to the printer 2. The printer 2 stores the user information list 121 including a user name and a password. The printer 2 accepts the password through the operation panel 16. The printer 2 collates the password corresponding to the user name received from the cloud server 5 stored the user information list 121 with the password accepted through the operation panel 16. Namely the printer 2 executes a user authentication. When each password doesn't correspond as a result of collation, the printer 2 restricts output of printing the image data to a sheet.

Therefore, the cloud print system 1 can execute the user authentication at printer 2 even when the printer driver isn't installed to the user terminal 4 instructing to execute the printing, namely, the user terminal 4 can't generate the print job including the user name because the printer driver isn't installed to the user terminal 4.

2. Modification of the First Embodiment

In the first embodiment, the record of the user information list 121 can be added. For example, the operating displaying unit 16 of the printer 2 accepts the input by a user operation. The control 10 added the record of the user information list 121 based on this input. Then the control 10 updates the setting value of the user name 1227 of the printer information 122 stored in the printer 2 based on the user information list 121 added the record. Specifically, the control 10 adds the record corresponding to "user E," to the user information list 121. Then the control unit 10 adds "user E" to the setting values of the user name of the printer information 122. Namely, the number of setting values of the user name 1227 increases by one. Then the control unit 10 transmits the updated printer information 122 to the cloud print server 5.

The control unit 30 of the cloud print server 5 receives the updated printer information 122. Then the control unit 30 updates the existing printer information 122 stored the memory unit 32 to the printer information 122 received this time.

In the first embodiment, the user information list 121 can be set through the operation panel 161. And the user information list 121 may be set from an apparatus different from the printer 2 through LAN 7.

And the cloud print server 5 may receive the printer information 121 from an apparatus different from the printer 2. And the cloud print server 5 may receive each item of the printer information 121 in a different timing.

In the first embodiment, the printer 2 generates the printer information 121. Then the printer 2 may transmit only the printer information 121 to cloud print server 5. The memory unit 12 doesn't need to store to the printer information 121.

The user information list 121 should include at least the items of the user name 1211 and the password 1212.

In step S12 shown FIG. 8, the operation display unit 16 of the printer 2 displays the two dimensional bar-code indicating the authentication destination URL. And the imaging unit 48 of the user terminal 4 photographs the two dimensional bar-code. However the printer 2 may transmit the information indicating the authentication destination URL to the user terminal 4. And the operating displaying unit 16 may display the character string of the authentication destination URL.

In step S30 shown FIG. 9A, the printer 2 receives the additional notification and the print setting information 323. Then the printer 2 displays the login screen 1611 not through the user operation. However the printer 2 may display the login screen 1611 when the printer 2 accepts the user operation through the operation panel 161.

In the first embodiment, in step S28 shown FIG. 9A, the control 30 of the cloud print server 5 transmits the print setting information 323 to the printer 2. In steps S30 to S35 shown FIGS. 9A and 9B, the control unit 10 of the printer 2 executes determining process of print permission such as authentication process. In step S36 shown FIG. 9B, the control unit 10 transmits the print job acquiring request to the cloud print server 5. In step S37 shown FIG. 9B, the control 30 transmits the print job to the printer 2.

However, in step 28, the control unit 30 of the cloud print server 5 may transmit the print job including the print setting information 323 and the image data to the printer 2. Then in steps S30 to S35, the control unit 10 of the printer 2 may execute determining process of print permission such as authentication process. Then process in step S36 and step S37 isn't executed. In step S38, the printer 2 may execute the printing process based on the print job transmitted in step S28.

The printer 2 may calculate the amount of charging every user based on the setting value of the number of printing permission sheets 1214 of the user information list 121. Specifically, the printer 2 may calculate the amount of charging of each user based on the setting value of the subtraction for the number of printing permission sheet 1214 of each user.

In the first embodiment, the cloud print server 5 issues the printer ID. However, the cloud print server 5 may acquire the apparatus identification information peculiar to the printer 2 that the printer 2 holds such as MAC (Media Access Control) address. Then the acquired apparatus identification information may substitute for the printer ID.

The cloud print system 1 may include the plurality of printers.

In the first embodiment, the printer 2, the user terminal 4 and the cloud print server 5 are communicably connected to one another through the internet 6. However, the printer 2, the user terminal 4 and the cloud print server 5 may be communicably connected to one another through various means of communication such as an USB (Universal Serial Bus) cable and LAN of cable broadcasting/radio based on the standards such as IEEE (Institute of Electrical and Electronics Engineers) 802.3 u/ab, IEEE 802.11a/b/g/n.

In the first embodiment, the user terminal 4 designates the image data. The printer 2 receives the print job. Then the printer 2 executes the printing processing. However, the printer 2 may be replaced with an information processing apparatus. And the user terminal 4 may designate contents data. Then the information processing apparatus may receive the contents data. Then the information processing apparatus may execute predetermined processing.

The printer 2 in the embodiment 1 may be replaced with various apparatus such as a copy apparatus, a FAX apparatus and MFP.

The printer 2, the user terminal 4 and the cloud print server 5 in the embodiment 1 may include various other units.

The user terminal 4 in the embodiment 1 may be replaced with various apparatus such as an information processing apparatus, an image scanner, an FAX apparatus and a MFP.

What is claimed is:

1. An image forming system, comprising:
   a client apparatus, a server apparatus and an image forming apparatus communicably connected with one another,
   the client apparatus including:
     a first processor configured to execute a first set of program instructions to thereby provide functions of a designating unit that designates first identification information stored in the server apparatus and image data;
   the server apparatus including:
     a first memory configured to store the first identification information; and
     a transmitter configured to transmit the first identification information and the image data designated by the designating unit to the image forming apparatus; and
   the image forming apparatus including:
     a receiver configured to receive the first identification information and the image data from the transmitter;
     a printing device configured to output the image data on a sheet;
     a second memory configured to store second identification information, and first authentication information corresponding to the second identification information, beforehand;
     an operation device configured to accept second authentication information; and
     a second processor configured to execute a second set of program instructions, to thereby provide functions of a control unit that restricts the printing device from outputting the image data on the sheet upon detecting that the first identification information corresponds to the second identification information, and that the second authentication information does not correspond to the first authentication information.

2. The image forming system according to claim 1, wherein the first identification information indicates a requestor of outputting the image data, the first identification information being information for identifying an apparatus.

3. The image forming system according to claim 1, wherein the first identification information is information for identifying a user.

4. The image forming system according to claim 1, wherein each of the first authentication information and the second authentication information is a password.

5. The image forming system according to claim 1,
   wherein the first memory stores first print condition information;
   wherein the designating unit designates the first print condition information;
   wherein the transmitter transmits the first print condition information designated by the designating unit to the image forming apparatus;
   wherein the receiver receives the first print condition information from the transmitter;
   wherein the control unit controls the printing device to output the image data on the sheet based on the first print condition information.

6. The image forming system according to claim 5,
wherein the second memory stores second print condition information corresponding to the second identification information beforehand; and
wherein the control unit restricts the printing device from outputting the image data on the sheet, when the first print condition information does not correspond to the second print condition information.

7. The image forming system according to claim 6, wherein each of the first print condition information and the second print condition information indicates a color or monochrome printing mode.

8. The image forming system according to claim 6, wherein each of the first print condition information and the second print condition information is information for identifying a paper feed tray.

9. The image forming system according to claim 1,
wherein the server apparatus further includes a third processor configured to execute a third set of program instructions to thereby provide functions of a WEB server unit that provides the client apparatus with screen image data for designating the first identification information and the image data; and
wherein the first processor of the client apparatus is further configured to execute the first set of program instructions to thereby provide functions of a WEB browser unit that generates a screen image based on the screen image data provided by the WEB server unit.

10. The image forming system according to claim 1, wherein after the receiver receives the first identification information, the control unit controls the receiver to receive the image data when the second authentication information corresponds to the first authentication information.

11. The image forming system according to claim 1, wherein after the receiver receives the first identification information, the control unit controls the receiver not to receive the image data when the second authentication information does not correspond to the first authentication information.

12. The image forming system according to claim 1,
wherein the designating unit designates one of plural pieces of identification information based on a selection operation;
wherein the control unit restricts the printing device from outputting the image data on the sheet, when the second authentication information does not correspond to the first authentication information, which corresponds to the identification information designated by the designating unit.

13. The image forming system according to claim 1, wherein the server apparatus further includes a third processor configured to execute a third set of program instructions to thereby provide functions of an acquiring unit that acquires the image data designated by the designating unit.

14. The image forming system according to claim 13, wherein
the client apparatus further includes a third memory configured to store the image data; and
the acquiring unit acquires the image data stored in the third memory.

15. The image forming system according to claim 13, wherein
the server apparatus further includes a fourth memory configured to store the image data; and
the acquiring unit acquires the image data stored in the fourth memory.

16. An image forming apparatus, comprising:
a receiver configured to receive first identification information and image data from an external apparatus;
a printing device configured to output the image data on a sheet;
a memory configured to store second identification information, and first authentication information corresponding to the second identification information, beforehand;
an operation device configured to accept second authentication information;
a processor configured to execute a set of program instructions, to thereby provide functions of a control unit that restricts the image forming unit from outputting the image data on the sheet upon detecting
that the first identification information corresponds to the second identification information, and
that the second authentication information does not correspond to the first authentication information.

17. The image forming apparatus according to claim 16, wherein after the receiver receives the first identification information, the control unit controls the receiver to receive the image data when the second authentication information corresponds to the first authentication information.

18. The image forming apparatus according to claim 16, wherein after the receiver receives the first identification information, the control unit controls the receiver not to receive the image data when the second authentication information does not correspond to the first authentication information.

* * * * *